United States Patent [19]

Ortiz, Jr. et al.

[11] Patent Number: 4,764,655

[45] Date of Patent: Aug. 16, 1988

[54] REAL-TIME LASER BEAM DIAMETER DETERMINATION IN A LASER-MATERIALS PROCESSING SYSTEM

[75] Inventors: Angel L. Ortiz, Jr., Scotia; Tushar S. Chande, Schenectady, both of N.Y.

[73] Assignee: General Electric Company, Schenectady, N.Y.

[21] Appl. No.: 91,478

[22] Filed: Aug. 31, 1987

[51] Int. Cl.$^4$ .............................................. B23K 26/02
[52] U.S. Cl. ........................... 219/121.83; 219/121.64; 219/121.65
[58] Field of Search ..... 219/121 L, 121 LD, 121 LC, 219/121 LM, 121 LG, 121 LN, 121 LH, 121 LJ; 356/121, 122

[56] References Cited

U.S. PATENT DOCUMENTS

| | | | |
|---|---|---|---|
| 3,861,801 | 1/1975 | Peters et al. | 356/121 |
| 4,320,462 | 3/1982 | Lund et al. | 356/121 |
| 4,450,339 | 5/1984 | Corby, Jr. | 219/124.34 |
| 4,532,408 | 7/1985 | Richardson | 219/130.01 |
| 4,564,736 | 1/1986 | Jones et al. | 219/121 L |
| 4,578,561 | 3/1986 | Corby, Jr. et al. | 219/124.34 |
| 4,595,820 | 6/1986 | Richardson | 219/137 PS |
| 4,596,461 | 6/1986 | DeRosa et al. | 356/121 |
| 4,611,111 | 9/1986 | Baheti et al. | 219/124.34 |
| 4,613,743 | 9/1986 | Nied et al. | 219/130.21 |
| 4,645,917 | 2/1987 | Penney et al. | 250/201 |
| 4,673,795 | 6/1987 | Ortiz, Jr. | 219/121 L |
| 4,676,586 | 6/1987 | Jones et al. | 350/96.20 |
| 4,681,396 | 7/1987 | Jones | 350/96.18 |
| 4,707,073 | 11/1987 | Kocher | 350/96.23 |

OTHER PUBLICATIONS

"Coaxial Arc Weld Pool Viewing for Process Monitoring and Control" by Richardson et al., Welding Jnl, Mar. 1984, pp. 43–50.

"Laser Beam Profiling the Automated Way" by Rypma, Photonics Spectra, Aug. 1987, pp. 67–74.

Primary Examiner—C. L. Albritton
Attorney, Agent, or Firm—Richard V. Burgujian; James C. Davis, Jr.; Paul R. Webb, II

[57] ABSTRACT

A laser-materials processing system including means for determining an incident diameter of a laser beam at a point of laser beam-material interaction on a workpiece, is disclosed. A filtered image of the interaction point is transmitted, via an imaging fiber bundle, to a video camera. The analog video signal generated thereby is digitized and provided to a computer which evaluates the pixel magnitudes along a beam image diameter line to determine therefrom the incident laser beam diameter.

15 Claims, 5 Drawing Sheets

REAL-TIME LASER BEAM DIAMETER DETERMINATION IN A LASER-MATERIALS PROCESSING SYSTEM

The present invention is related in general to laser-materials processing systems and, more specifically, to apparatus and method for determining the beam diameter of a materials processing laser at a laser beam-material interaction point.

BACKGROUND OF THE INVENTION

The incident diameter of a materials processing laser beam is one of the most important parameters in a laser-materials processing system. The specific diameter of interest is that of the laser beam at a point of laser beam-material interaction on a workpiece being subjected to laser processing. Such processing is that which is typically performed with a high power (approximately 50 watts or more) materials processing laser and can include cutting, drilling or welding operations the workpiece.

The incident beam diameter, among other laser-materials process parameters such as the speed at which the beam traverses the workpiece and beam power, is critical to controlling the nature and quality of the processing operation being performed. That is, it is critical to know the incident beam diameter and control it to assure a particular process result. It is currently known in the art to estimate, as opposed to directly measure, the incident beam diameter by using geometrical optics or by inspecting the workpiece after processing. Measuring melt widths on the workpiece after processing provides some indication of beam diameter. The use of melt isotherms for determining incident beam diameter is also known but lacks accuracy since the isotherms typically lie outside the actual beam diameter. These and other estimating techniques typically provide beam diameter with limited accuracy and consistency and, in some cases, by their nature are only performable after the processing is complete.

It would therefore be desirable to provide apparatus and method for directly measuring, rather than merely estimating, the incident diameter of a materials processing laser beam. Further, it would be highly desirable for such beam diameter determination apparatus and method to provide determined beam diameter information in real time so that the laser-materials process can be controlled, in real time, in accordance therewith. In the broadcast sense, real time information and control are used herein to describe information related to the process, such as incident laser beam diameter, obtained during process operation and the control of process parameters in accordance with the real time information, such control also being effected during process operation. It is noted that the time period between obtaining real time information and the responsive adjustments of process parameters will vary depending on the nature of the particular process.

One technique known in the art for directly measuring beam diameter is to make burn patterns on photosensitive paper (typically for low paper applications) or on a Lucite ® block (typically for $CO_2$ lasers). The burn pattern technique is not a per se real-time measurement of beam diameter since the pattern must be evaluated by a human system operator in order to determine the diameter. Further, unless the burn pattern material directly overlays the workpiece, a practice which may interfere with the operation of a robotic vision control feedback system, the beam must be directed away from the workpiece in order to perform the diameter determination. The use of a photo detector array enables a second technique, known in the art, for direct measurement of beam diameter. The laser beam is directed onto the photo detector array and the responsive signals provided by the photo detector elements comprising the array enable, inter alia, beam diameter measurements. Such arrays, as known to the inventors herein are, however, limited to use with low power lasers (e.g. a maximum laser power on the order of 0.5 watts) and are therefore not suitable for application in the laser-materials processing system contemplated herein. Further, as in the case of the burn pattern technique, the laser beam must be directed away from the workpiece in order to perform the beam diameter determination. As a result, the diameter determination is not truly performed in real time. One photo detector array enabling beam diameter measurement, as well as software for the processing of the photo detector array signals, is manufactured by Spiricon, Inc. of Logan, Utah as the Laser Matrix Probe.

Other software packages are known in the art that process a digitized image, such as derived from video camera apparatus, of a laser beam. Such processing is adapted to perform an extensive set of beam diagnostic functions. For example, the BEAMCODE diagnostic system sold by Big Sky Software Corporation of Bozeman, Mont. processes beam image information and provides graphical and/or text representations of beam characteristics including intensity profile, diameter, power, divergence, centroid, peak and three-dimensional isometric representation. Such software packages, however, are not intended for and cannot be implemented for the real time process control application contemplated herein. They are instead adapted for "off-line" processing of the beam image data. Due to the extensive number of complex diagnostic functions performed, a substantial amount of computing time is required for the ultimate provision of relevant beam characteristics. This substantial computing time renders the performance of such software packages too slow for the real time application contemplated herein. Further, the digital representation of the information relevant to the present control application, i.e. the beam diameter, is part of an overall information readout in such software packages and cannot be isolated for direct use in process control. That is, no discrete signal proportional to beam diameter is provided to enable process control in accordance therewith.

It is therefore a principal object of the present invention to provide apparatus and method for direct measurement of the incident beam diameter of a materials processing laser beam.

It is a further object of the present invention to provide apparatus and method for direct, real-time determination of incident beam diameter of a materials processing laser in a laser-materials processing system.

It is an additional object of the present invention to provide a laser-materials processing system including apparatus for direct, real-time determination of incident laser beam diameter and control of the process in accordance with the determined beam diameter.

SUMMARY OF THE INVENTION

The foregoing objects are achieved by the present invention which is directed to a laser-materials processing system, and method of operation thereof, in which the incident diameter of a materials processing laser beam is determined in real-time. The processing system comprises means for subjecting a workpiece to the laser beam generated by the materials processing laser and means for providing an image of a laser beam-material interaction point, on the workpiece, at which the beam diameter is to be measured. The processing system also comprises means for processing the interaction point image to determine the incident laser beam diameter and closed loop controller means for receiving the determined beam diameter to enable control of processing system operation in accordance therewith.

The processing means comprises means for representing the interaction point image as a plurality of pixels each having an intensity magnitude and a pixel address. The representing means is provided in the illustrated embodiment as an image representation module comprising a video camera which provides an analog video signal representative of the image and a camera interface module for digitizing the camera analog video signal to provide a digital representation of the pixel address and pixel intensity magnitude of each pixel of the image. The processing means further comprises means, provided as a computer in the illustrated embodiment, for evaluating the magnitude of a selected group of pixels at corresponding selected pixel addresses along a predetermined beam image diameter line to determine the incident laser beam diameter. The evaluating means determines the pixel intensity magnitude of a beam center pixel and computes a beam perimeter pixel intensity magnitude as a predetermined fraction, $1/e^2$ in the illustrated embodiment, of the beam center pixel magnitude. The address of the beam center pixel is either determined in advance or by selection of the pixel having the greatest magnitude within the group. The pixel group comprises at least one row of pixels along the beam diameter line and the evaluating means determines the pixel addresses of a first and a second beam perimeter pixel located along the pixel row and respectively on opposite sides of the center pixel. The magnitude of each of the first and second beam perimeter pixels is less than that of the pixels both along the row and successively closer to the center pixel and is equal to or less than the perimeter pixel magnitude. The incident beam diameter is proportional to the distance between the first and second beam perimeter pixels.

The beam diameter determination method of the present invention commences with the step of providing an image of the laser beam-material interaction point. Next, that image is represented as a plurality of pixels each having an intensity magnitude and a pixel address. Given a selected group of pixels at corresponding selected pixel addresses along a predetermined beam image diameter line and comprising at least one row of pixels, the intensity magnitude of a beam center pixel within the group is determined and a beam perimeter pixel industry magnitude computed as a predetermined fraction, $1/e^2$ in the illustrated embodiment, of the beam center pixel magnitude. The address of the beam center pixel is either determined in advance or by selection of the pixel having the greatest magnitude within the group. As a final step, the pixel addresses of a first and a second beam perimeter pixel located along the pixel row and respectively on opposite sides of the center pixel are determined. The magnitude of each first and second beam perimeter pixel is less than that of the pixels both along the row and successively closer to the center pixel and is equal to or less than the perimeter pixel magnitude. The beam diameter is proportional to the distance between the first and second beam perimeter pixels.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing Figures, in which:

DESCRIPTION OF THE INVENTION

Figure 1:
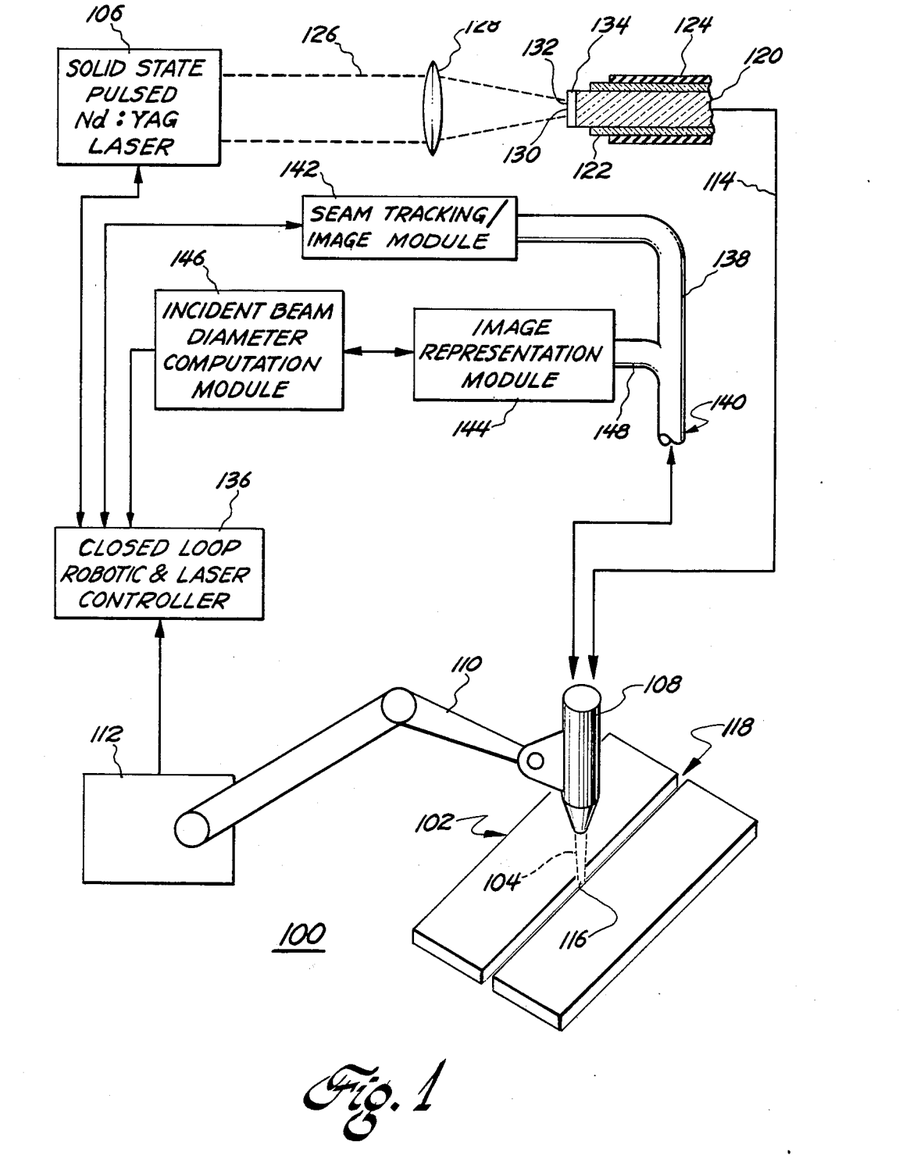
FIG. 1 illustrates a laser-materials processing system constructed in accordance with the present invention.

Referring now to the drawings, FIG. 1 illustrates a laser-materials processing system 100, such as for the exemplary seam welding of a workpiece 102, in which the incident diameter of a focused laser beam 104 is determined in real time and used in the closed loop process control. System 100 includes a 1.06 micrometer wavelength neodymium: yttrium-aluminum-garnet (Nd:YAG) laser 106 for providing a pulsed power laser beam with an average output power on the order of 400 watts. Such a laser is available from Raytheon Corporation of Burlington, Mass. as model #SS550. A remote or output module 108 is adapted for manipulation by an arm 110 of an industrial robot 112.

A single-core optical fiber 114 transmits energy from laser 106 to remote module 108 to be collimated and focused by an optical system within the remote module to emerge as beam 104 focused to a point 116 on workpiece 102 to effect welding of a representative seam 118. Thus, point 116 is the point of laser beam-material interaction. The laser beam-material interaction point as used herein is not a "point" in a mathematical sense but rather a small region on the workpiece where the focused laser beam, which has a finite diameter, interacts with the workpiece. Optical fiber 114 may comprise a 1000 micrometer (0.040 in.) diameter fused quartz core 120 with clear silicon cladding 122 and an outer nylon jacket 124 for physical protection. A beam 126 emerging from the laser is focused by a lens 128 to a spot 130 on an input end 132 of the optical fiber. To enhance transmission of the laser beam 126 energy into the optical fiber, an antireflective coating 134 is provided on end 132.

Various techniques for the efficient coupling of such laser energy into a fiber optic core are described in the commonly-assigned U.S. Pat. Nos. 4,564,736; 4,676,586; and 4,681,396 respectively entitled "Industrial Hand Held Laser Tool and Laser System", "Apparatus and Method for Performing Laser Material Processing Through a Fiber Optic", and "High Power Laser energy Delivery System", the entire disclosures of which are hereby expressly incorporated by reference.

For controlling the operation of system 100, a closed loop robotic and laser controller 136 is provided. Controller 136 operates generally in accordance with known principles employing vision and seam tracking for guiding robot arm 110 and operating laser 106. To enable such seam tracking, a branch 138 of a fiber optic bundle 140 for transmitting images is connected between remote module 108 and a seam tracking/image processing module 142. Module 142 is in turn coupled to controller 136 to enable closed loop control of the movement of robot arm 110. As stated above, methods for robotic control by seam tracking are known in the art. Such methods do not form a part of the present invention and are therefore not disclosed in detail herein. Exemplary apparatus for performing such seam tracking is disclosed in commonly-assigned U.S. Pat. No. 4,645,917 entitled "Swept-Aperture Flying Spot Profiler", which is incorporated in its entirety herein by reference.

Remote module 108 includes a plural path optical system both for focusing the laser beam emerging from an output end of fiber 114 along a first optical path to point 116 on workpiece 102, and for imaging that point of laser beam-material interaction along a second optical path onto the end of imaging fiber bundle 140. Various constructions of remote module 108 are disclosed in plural embodiments of commonly-assigned U.S. Pat. No. 4,673,795 entitled "Integrated Robotic Laser Material Processing and Imaging System", which is incorporated in its entirety herein by reference.

Processing system 100 further includes an image representation module 144 for providing a digitized pixel representation of the image of the laser beam-material interaction point. Also included in the processing system is an incident beam diameter computation module 146 which is coupled to receive the digitized image as provided by module 144 and determine therefrom the diameter of laser beam 104 at the interaction point. In order for image representation module 144 to provide the pixel representation of the laser beam-material interaction point, it is provided with an optical image of that point via a branch 148 of imaging fiber bundle 140. Beam diameter computation module 146 is coupled to closed loop controller 136 to provide thereto the computed beam diameter. The operation of system 100 can thereby be further subjected to real-time closed loop control in accordance with the determined beam diameter. As a result, system parameters such as laser beam diameter, laser pulse rate and power and the traverse speed of focused beam 104 across workpiece 102 can be adjusted in real-time in response to the real-time determinations of the incident laser beam diameter.

Figure 2:
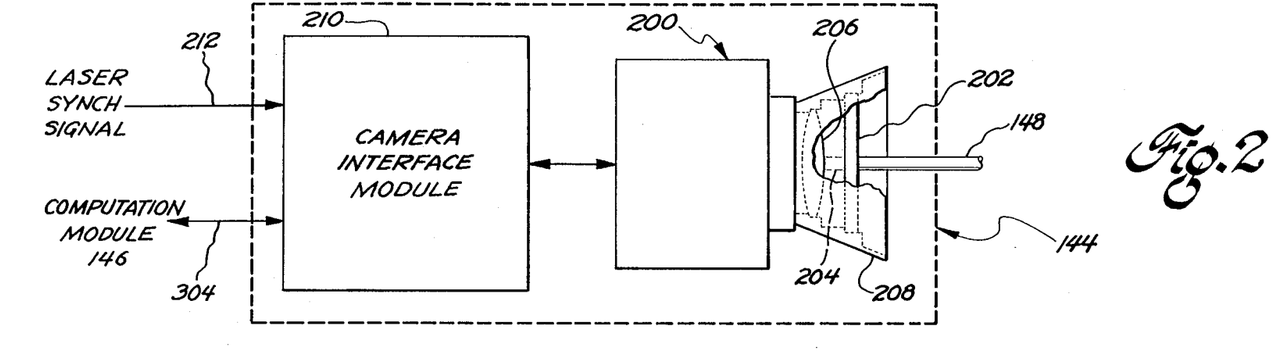
FIG. 2 illustrates in greater detail an image representation module shown in FIG. 1.

Image representation module 144 is illustrated in greater detail in FIG. 2 and is seen to comprise a video camera 200 which receives the optical image of the laser beam-material interaction point via image fiber bundle branch 148. The image transmitted by fiber bundle 148 is filtered through a filter 202 so that a filtered image 204 falls incident on a focusing lens 206 of camera 200. Filter 202 is selected to transmit only 1.06 micrometer wavelength light, i.e. that corresponding to the laser beam as generated by laser 106, to thereby attenuate plasma intensity so that the image of the incident laser beam projected on the workpiece surface is clearly defined. Filter 202 is shown mounted within a lens hood 208 of the camera in order to minimize the distance traveled by the filtered image to the lens and also to exclude ambient light. Additional supporting apparatus, not shown, is required to assure no relative movement between fiber bundle 148, filter 202 and camera 200. Further, the apparatus for supporting fiber bundle 148 need also have the capability to effect small adjustments in the fiber bundle position to enable adjustable alignment of the image transmitted by the bundle with the lens and a pixel device field within the camera.

Camera 200 is preferably provided as a model TN2509 solid state charge injection device camera manufactured by General Electric Company (Electronic Camera Operation located in Liverpool, N.Y.). That camera provides an analog video signal representative of an image frame consisting nominally of 256×256 pixels. The TN2509 camera includes an injection inhibit feature that enables it to be operated in a "snap shot" mode. In that mode, which is utilized in the practice of the embodiment illustrated herein, the camera can be used to provide an image of a transient event.

A camera interface module 210 is provided to receive from camera 200 the analog video signal representing the image frame, convert that signal to digital form and store the resulting digital frame. As a result, a pixel address and pixel intensity magnitude is stored for each image pixel of the image frame. Such interface modules, as is known in the art, typically also control the operation of the camera, e.g. provide to the camera a master clock signal as well as horizontal and vertical reset signals. Camera module 210 can be provided as a Model 509 Camera Support Module manufactured by Poynting products, Inc. of Oak Park, Ill. The Model 509 camera support module is adapted to operate under the control of commands issued by a host computer. In response to such host computer commands, the Model 509 module can be commanded to operate in an external trigger mode in which it is responsive to an externally generated trigger signal. In that mode, upon receipt of the external trigger signal, the Model 509 module causes the TN2509 camera to record a "snap shot" of the image it is in receipt of at that instant. For this purpose, camera module 210 is coupled to receive, via an interconnection 212, a synchronizing signal from pulsed laser 106 as the trigger signal. As is well known in the art, pulsed lasers such as the above-noted Raytheon Model #SS550 laser, are constructed to provide a synchronizing signal consisting of a pulse train in which each synchronizing pulse is generated immediately in advance of each laser beam pulse.

Figure 3:
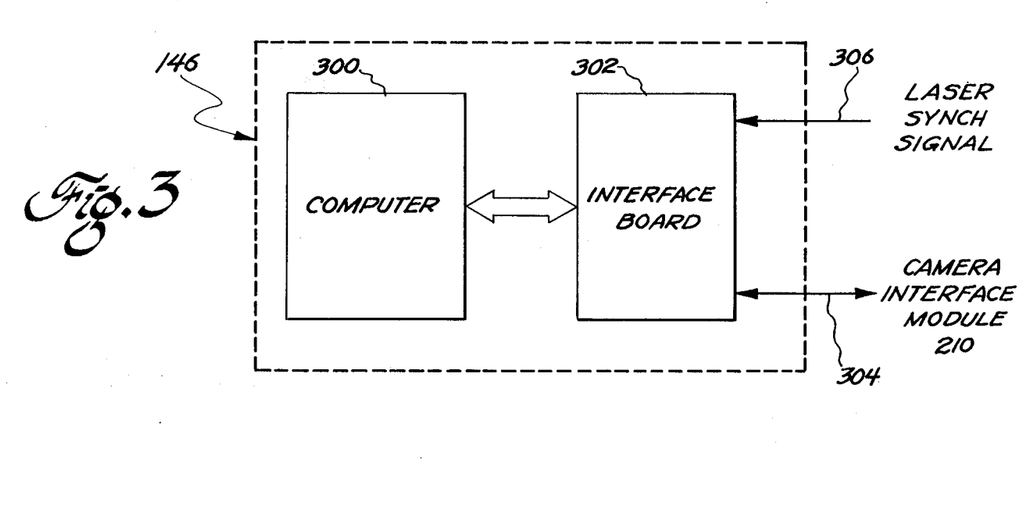
FIG. 3 illustrates in greater detail an incident beam diameter computation module shown in FIG. 1.

Referring now to FIG. 3, computation module 146 is seen to comprise a computer 300 such as an IBM PC/AT computer for controlling the operation of camera interface module 210 and for computing the incident laser beam diameter from digital image frame data received from the camera interface module. To enable such operation, computer 300 is coupled to camera module 210 through an interface board 302. Interface board 302 may be provided as a module ANC-1055 digital I/O card manufactured by Antona Corporation of Los Angeles, Calif. In FIGS. 2 and 3, computer 300 is illustrated as being coupled to camera module 210 via an interconnection 304 for receipt of frame data and issuance to the camera module of host computer commands. Computer 300 is also coupled to receive, through the interface board, via an interconnection 306, the above-described laser synchronizing signal.

Figure 4:
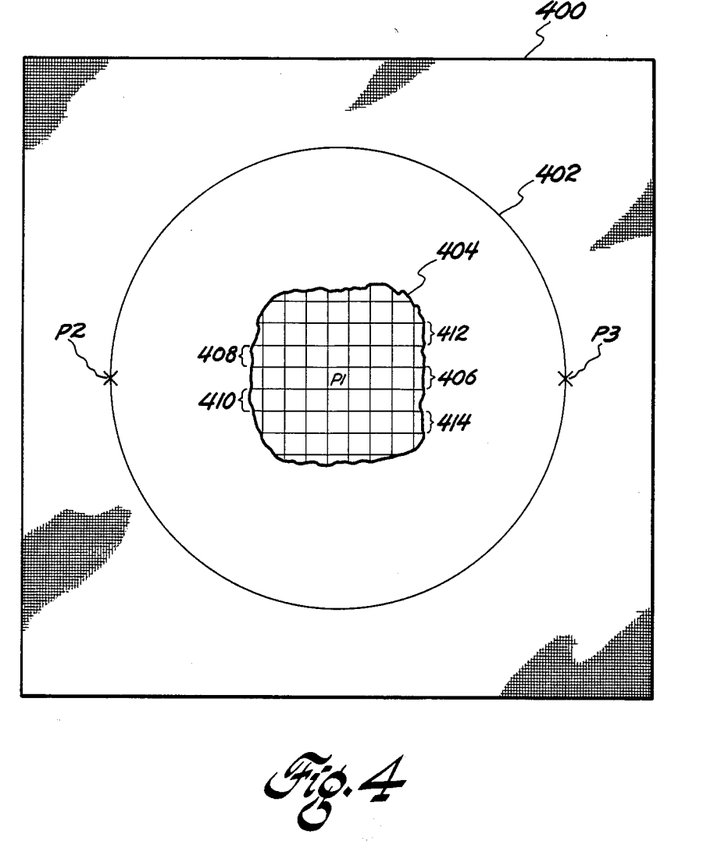
FIG. 4 illustrates a pixel device field of a camera included in the image representation module illustrated in FIG. 2.

Prior to operation, it is necessary to align fiber bundle 148 relative to the camera lens so that the incident laser beam image is substantially centered on the field of 256×256 pixel devices of the camera. Also, the camera is focused and the optics within remote module 108 selected so that a beam image having an anticipated nominal image diameter covers a substantial portion of the camera pixel device field. Such coverage assures a high resolution for beam diameter determination. It is preferred that the anticipated nominal beam diameter extend over approximately 200 pixels. FIG. 4 illustrates a substantially square camera pixel device field 400 consisting of 256×256 pixel devices, only a few of which are illustrated. A circle arbitrarily delineating a laser beam image 402 is projected onto the device field and within the beam image a magnified portion 404 of the pixel device field, including the center of that field, is illustrated. Thus, the fiber bundle alignment is performed so that the center of the beam image substantially coincides with a center pixel labelled P1 in FIG. 4. Since the address of all pixels is known in advance, the center pixel P1 address is known, that address being used by computer 300 in the beam diameter determination, as more fully described below. The row of pixels containing center pixel P1, by alignment, lies along a diameter line of the beam image and thus form a beam diameter pixel row 406.

Once alignment of the beam image has been accomplished, it is necessary to determine a correlation between the pixel device field and actual beam diameter dimensions. To accomplish this, the image of a circular calibrating figure of known diameter is introduced through image fiber bundle 140 so that its image is projected, via bundle 148, onto the camera pixel device field. The number of pixels spanning the diameter of that image is noted. By performing this multiple circular calibrating figures of different known diameters, a look-up table correlating the number of diameter spanning pixels and actual figure diameter can be prepared. This look-up table is provided to computer 300 for subsequent use in the beam diameter determination.

Figure 5A:
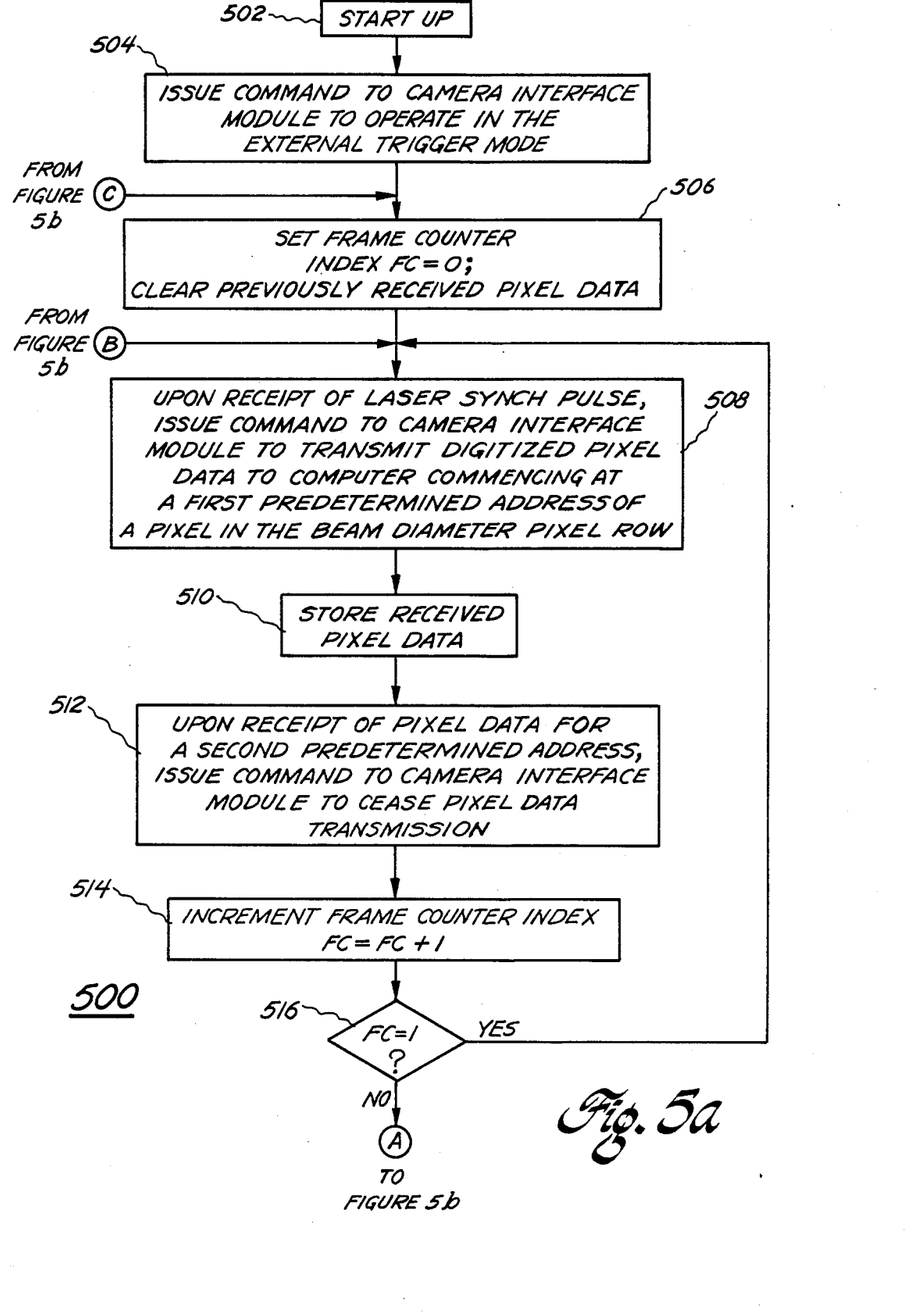
FIGS. 5a and 5b provide a flowchart representation of a program executed by a computer comprising the beam diameter computation module shown in FIG. 3.
Figure 5B:
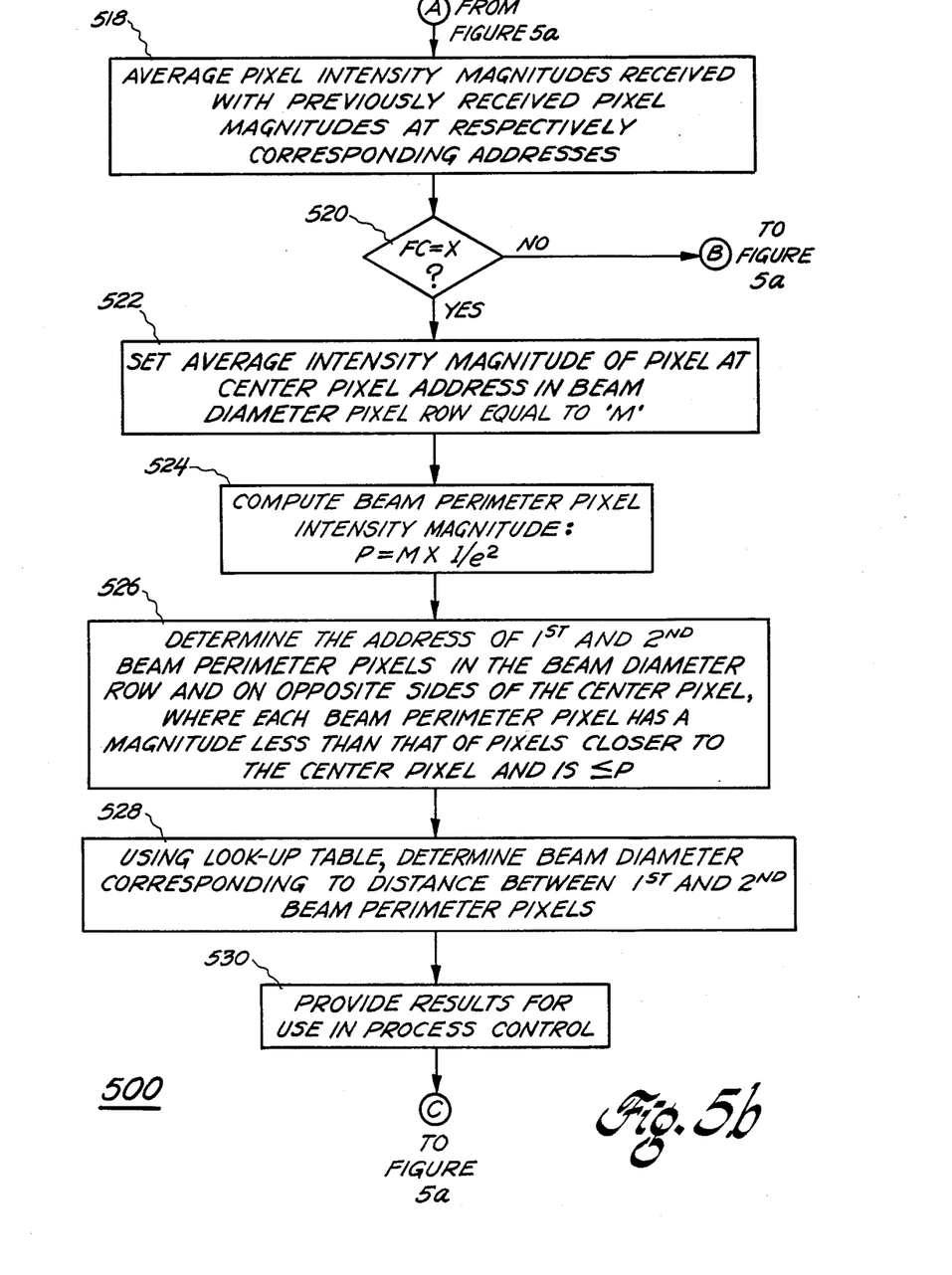

In the operation of system 100, laser 106 generates a pulsed laser beam which is transmitted through fiber 114 and directed onto workpiece 102 as focused beam 104. The image of the laser beam-material interaction point is transmitted via imaging fiber bundle 140, and bundle branch 148 thereof, to image module 144 where it is transmitted through filter 202 and onto the pixel device field of camera 200. As noted above, each laser beam pulse is immediately preceded by a synchronizing signal pulse provided by laser 106. Each of the latter pulses is received substantially simultaneously by both computer 300 (FIG. 3) and camera interface module 210 (FIG. 2). FIGS. 5a and 5b illustrate a flowchart 500 which sets forth the program steps generally followed by computer 300 in controlling the operation of camera 200 and interface module 210 and in computing the incident laser beam diameter. The program steps are adapted to the particular features of the above described General Electric TN2509 camera and Poynting Products Model 509 module. However, the modification of those program steps for application to other analogous devices will be readily apparent to those skilled in the art. At startup 502, the computer proceeds to a step 504 in which it issues a command to the camera interface module to operate in the external trigger mode. Next, at a step 506, a frame counter index, designated FC, is set equal to '0'. Also, any pixel data stored in the computer from previous diameter determinations is cleared at this step. No further action is required until a laser synchronizing signal pulse is received by the computer. In view of the command issued by the computer at step 504, the Poynting Products Model 509 module will, upon receipt of the synchronizing signal pulse, cause the TN2509 camera to take a "snap shot" of the beam image at that instant. In view of the negligible delay (on the order of 50 microseconds) ensuing between the synchronizing signal pulse and arrival of the laser beam pulse, no additional delay needs to be introduced and triggering by the synchronizing signal pulse will result in capture of the incident laser beam image.

The computer, upon receipt of the laser synchronizing signal pulse (step 508), issues a command to the camera interface module to transmit to the computer the digitized frame data commencing at a predetermined pixel address corresponding to a pixel in beam diameter row 406 at or near the left edge (as FIG. 4 is viewed) of pixel device field 400. Pixel data so received is stored by computer 300 (step 510). It is noted that the Poynting Products module provides pixel data on a row-by-row basis, from left-to-right and from top-to-bottom of the pixel field (as viewed in FIG. 4). Upon receipt of the pixel data corresponding to a predetermined pixel address in row 406 at or near the right edge of pixel device field 400, the computer issues a command to interface module 210 to cease transmitting pixel data (step 512). As a result, computer 300 receives and stores as relevant pixel data the addresses and intensity magnitudes for substantially all the pixels in beam diameter row 406.

At step 514, the frame counter index FC is incremented. Then, at step 516, the computer checks whether only a single frame has so far been received. If so, step 508 is returned to and steps 508 through 516 are performed again. If more than one frame has been so far received, the program proceeds from step 516 to step 518 (FIG. 5b) in which single pixel averaging is performed, i.e. the pixel intensity magnitude for each pixel address stored in the most recent performance of steps 508 through 512 is averaged with the previously received pixel intensity magnitude(s) for that pixel address. Next, at step 520 the frame counter index is checked to see whether the relevant pixel data from a predetermined number of frames "X" have already been received and averaged. If the predetermined number has not been received and averaged, the flowchart returns to step 508 (FIG. 5a) in order to receive the relevant pixel data corresponding to a subsequent laser beam pulse. It is preferred herein to select "X" to be on the order of 5.

Once relevant pixel data from "X" frames, and hence "X" laser beam pulses, has been single pixel averaged, the beam diameter may be calculated. At step 522, the averaged intensity magnitude of center pixel P1, which is assumed to be the maximum pixel magnitude due to its central location within beam image 402, is set equal to "M". Next, at step 524, the pixel intensity magnitude at the perimeter of the beam image is computed to be:

$$P = M \times 1/e^2,$$

where "e" is the base of the Napierian logarithmic sytem. The perimeter of the beam is so computed since this is the accepted definition in the art for a Gaussian beam. Having computed "P", the computer checks the averaged pixel intensity values at the pixel addresses in row 406 until first and second beam perimeter pixels are identified, those two pixels respectively being on opposite sides of center pixel P1 (step 526). Each beam perimeter pixel has an intensity magnitude less than that of the pixels between itself and center pixel P1 and that magnitude is equal to or less than the computed magnitude "P". Thus, commencing at center pixel P1, the computer scans in sequence the pixel addresses encountered along pixel row 406, first in one direction and then in the other, checking the intensity magnitude of each pixel until it arrives at a pixel the magnitude of which is equal to or less than "P". The approximate locations of the first and second perimeter pixels are indicated by "x"s in FIG. 4 and labelled P2 and P3, respectively. At step 528, the computer utilizes the previously described look-up table to determine the actual beam diameter corresponding to the distance between the first and second beam perimeter pixels. At step 530, the determined beam diameter is provided for use in process control. Following this step, the flowchart returns to 506 to commence anew the steps for beam diameter determination.

Thus, the method of incident beam diameter determination in accordance with the present invention commences with the step of providing an image of the laser beam-material interaction point. Next, that image is represented as a plurality of pixels each having an intensity magnitude and a pixel address. Given the selected group of pixels at corresponding selected pixel addresses along a predetermined beam diameter line and comprising at least one row of pixels, the intensity magnitude of the beam center pixel is then determined and the beam perimeter pixel intensity magnitude computed as a predetermined fraction of the beam center pixel magnitude. The beam center pixel address is either determined in advance or by selection of the pixel having the greatest magnitude within the group. As the final step, the pixel addresses of the first and second beam perimeter pixel located along the pixel row and respectively on opposite sides of the center pixel are determined, those beam perimeter pixels having magnitudes as described hereinabove. The beam diameter is then determined by its proportionality to the distance between the first and second beam perimeter pixels.

While pixel data for the single row of pixels containing the center pixel P1 is received by computer 300 for the beam diameter determination, that determination could as well be performed using multiple rows, e.g. two, three or more rows, where each such row lies along the beam image diameter line. For example, the pixel intensity magnitudes for the pixels in rows 408 and 410 (FIG. 4) immediately adjacent row 406 could also be stored and single pixel averaged by the computer. Then, in performing steps 526 and 528, beam perimeter pixels could be identified in rows 408 and 410 and the corresponding beam diameters determined. The beam diameters determined for all three pixel rows 406, 408, 410 would then be averaged. As a further example, a similar computation could be performed for a total of five pixel rows if additional rows 412 and 414 respectively adjacent rows 408 and 410 are also considered. Obviously further additional rows could also be considered. Further, rather than computing beam perimeter pixel magnitude "P" from the magnitude of pixel P1, the address of a center pixel for each pixel row 408, 410 etc. could be predetermined and its magnitude used in computing "P". Note that while pixel rows such as rows 408, 410, 412 and 414 are not coincident with the beam image diameter line, they are nevertheless considered herein to lie substantially along that line in view of the extremely small size of the individual pixels composing the 256×256 pixel device field.

While, in the program embodied in flowchart 500, the magnitude of the predetermined center pixel is used to compute "P", the invention is not so limited. Having determined in advance the pixel addresses corresponding to center row 406, and, if desired, rows adjacent thereto, the computer can scan the pixel data for each such row and determine the maximum pixel magnitude for use in computing "P". In general, numerous variations in the method of computing the beam diameter from the pixel data should now be readily apparent to those skilled in the art.

While the program embodied in flowchart 500 requires processing frame data for each successive laser beam pulse, this need not be the case. Additional steps may be introduced to perform the beam diameter determination using pixel data corresponding to every other beam pulse or every third beam pulse, etc. Further, upon completing step 530, the computer need not immediately return to step 506 to repeat the diameter determination computation. Instead, an arbitrary time delay may be introduced following step 530.

As indicated above, flowchart 500 is specifically adapted to utilize the capabilities and operating characteristics of the General Electric TN2509 camera and the Poynting Products Model 509 module. The invention is, however, not so limited. As is well known in the art, numerous other cameras and support modules, such modules being informally known as "frame grabbers", are readily available. Such other support modules may possess additional features such as a pixel averaging capability, thereby relieving the computer of this task. Further, such other support modules may lack the feature enabling transmission to the computer of only a portion of each frame. In such a case, the computer would receive the entire frame and would necessarily perform the additional step of discarding that portion of the pixel data not required for the beam diameter computation.

While the embodiment illustrated herein utilizes a pulsed laser, the invention is not so limited. The beam diameter determination apparatus and method of the present invention may be practiced with equal effectiveness in a system employing a continuous wave laser. In such a case, the laser synchronizing pulses would not be available for the triggering of camera operation and instead an arbitrary signal would have to be generated, e.g. such as by computer 300.

While a computer 300 is disclosed herein as impliedly being dedicated to performance of the beam diameter determination, this need not be the case. Computer 300 may be one in the same as the computer utilized in closed loop controller 136 of system 100 (FIG. 1). In performing the program illustrated in flowchart 500, the computer expends minimal time in performing the beam diameter determination and has substantial remaining unutilized capacity for performing the other tasks required for controlling system 100 operation.

While the beam diameter determination apparatus and method of the present invention is practiced with a high power materials processing laser, the invention is not so limited. The beam diameter determination taught herein may be practiced with equal effectiveness in system utilizing low power lasers.

While in the embodiment illustrated hereinabove, the program followed by computer 300 includes the step of determining the actual laser beam diameter corresponding to the distance between the beam perimeter pixels, the invention is not so limited. In the operation of laser-materials processing system 100, relative values of beam diameter may be sufficient to effect the closed loop control of the process. Upon initial set up of the system, once it is determined what distance between perimeter pixels yields desired process performance, closed loop control can be maintained in accordance therewith, there being no need for the actual beam diameter corresponding thereto.

The laser-materials processing system of the preferred embodiment uses optical fibers to deliver the power laser beam and transmit the image used for beam diameter determination. The invention is, however, not so limited. As is well known in the art, materials processing is as readily practiced without delivery of the power laser beam via an optical fiber. Also, an image of the laser beam-material interaction point on the workpiece may be transmitted to the beam diameter determination apparatus by conventional optical means, e.g. lenses, mirrors, etc., rather than by imaging optical fibers.

Though a compact, low weight arrangement results when the imaging fiber bundle 140 is constructed to provide branches 138 and 148 for transmitting the laser beam-material interaction point image to modules 142 and 144, respectively, the invention is not so limited. The system resolution can be increased, while maintaining a compact arrangement, when the image carried by imaging fiber bundle 140 is optically split, by means well known in the art, and the respective portions of the split image are transmitted through distinct imaging fiber bundles dedicated to modules 142 and 144. Further, if desired, the imaging optics portion of remote module 108, described in the above-incorporated U.S. Pat. No. 4,673,795, may be replicated so that remote module 108 provides multiple optical bundles providing separate optical links for imaging the point of laser beam-material interaction and the region around it. As a result, the interaction point image may be transmitted through discrete imaging fiber bundles provided to module 142 and module 144, which increases the weight and complexity of module 108, but increases system resolution as well. The choice of arrangement is governed by the necessary system resolution, weight restrictions on module 108 and level of complexity and integration acceptable in the system.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein by limited only by the scope of the appended claims.

What is claimed is:

1. Apparatus, for use in a laser-materials processing system, for determining the diameter of a laser beam at a point of laser beam-material interaction on a workpiece, said beam diameter determination apparatus comprising:
    means for providing an image of the laser beam-material interaction point; and
    means for processing said image to determine the diameter of said laser beam at the laser beam-material interaction point.

2. The apparatus of claim 1, said processing means comprising:
    means for representing said image as a plurality of pixes each having an intensity magnitude and a pixel address; and
    means for evaluating the magnitudes of a selected group of said pixels at corresponding selected pixel addresses along a predetermined beam image diameter line to determine said laser beam diameter.

3. The apparatus of claim 2 wherein the pixel address of a beam center pixel is predetermined, said evaluating means determining the intensity magnitude of said beam center pixel to compute a beam perimeter pixel intensity magnitude as a predetermined fraction of the beam center pixel magnitude; and
    said pixel group comprising at least one row of pixels along said beam diameter line, said evaluating means determining the pixel addresses of a first and a second beam perimeter pixel located along the pixel row and respectively on opposite sides of said center pixel, such that the magnitude of each said first and second beam perimeter pixel is less than that of the pixels both along the row and successively closer to said center pixel and is equal to or less than said perimeter pixel magnitude, said laser beam diameter being proportional to the distance between said first and second beam perimeter pixels.

4. The apparatus of claim 2, said evaluating means determining the pixel address of a beam center pixel having a maximum pixel magnitude within said pixel group and computing a beam perimeter pixel intensity magnitude as a predetermined fraction of the maximum pixel magnitude; and
    said pixel group comprising at least one row of pixels along said beam diameter line, said evaluating means determining the pixel addresses of a first and a second beam perimeter pixel located along the pixel row and respectively on opposite sides of said center pixel, such that the magnitude of each said first and second beam perimeter pixel is smaller than that of the pixels both along the row and successively closer to said center pixel and is equal to or less than said perimeter pixel magnitude, said laser beam diameter being proportional to the distance between said first and second beam perimeter pixels.

5. The apparatus of claim 2 wherein said representing means comprises a video camera; and
    said image receiving means comprising an imaging optical fiber for transmitting the laser beam-material interaction point image to a focusing lens of said camera.

6. A laser-materials processing system comprising:
    means for subjecting a workpiece to a laser beam generated by a materials processing laser;
    means for providing an image of a laser beam-material interacting point on the workpiece; and
    means for processing said image to determine the diameter of said laser beam at the laser beam-material interaction point.

7. The laser-materials processing system of claim 6 further including:
    controller means for receiving the determined laser beam diameter and controlling the operation of said materials processing laser in accordance therewith.

8. The laser-materials processing system of claim 7, said processing means comprising:

means for representing said image as a plurality of pixels each having an intensity magnitude and a pixel address; and means for evaluating the magnitudes of a selected group of said pixels at corresponding selected pixel addresses along a predetermined beam image diameter line to determine said laser beam diameter.

9. The laser-materials processing system of claim 8 wherein the pixel address of a beam center pixel is predetermined, said evaluating means determining the pixel intensity magnitude of said beam center pixel and computing a beam perimeter pixel intensity magnitude as a predetermined fraction of said beam center pixel magnitude; and said pixel group comprising at least one row of pixels along said beam diameter line, said evaluating means determining the pixel addresses of a first and a second beam perimeter pixel located along the pixel row and respectively on opposite sides of said center pixel, such that the magnitude of each said first and second beam perimeter pixel is less than that of the pixels along the row and successively closer to the center pixel and is equal to or less than said perimeter pixel magnitude, said laser beam diameter being proportional to the distance between said first and second beam perimeter pixels.

10. The laser-materials processing system of claim 8, said evaluating means determining the pixel address of a beam center pixel having a maximum pixel intensity magnitude within said pixel group and computing a beam perimeter pixel intensity magnitude as a predetermined fraction of said maximum pixel magnitude; and said pixel group comprising at least one row of pixels along said beam diameter line, said evaluating means determining the pixel addresses of a first and second beam perimeter pixel located along the pixel row and respectively on opposite sides of said center pixel, such that the magnitude of each said first and second beam perimeter pixel is less than that of the pixels both along the row and successively closer to the center pixel and is equal to or less than said perimeter pixel magnitude, said laser beam diameter being proportional to the distance between said first and second beam perimeter pixels.

11. The laser-materials processing system of claim 8, said representing means comprising:

a video camera for providing an analog video signal representative of said image; and camera interface means for digitizing the camera analog video signal to provide a digital representation of the pixel address and pixel intensity magnitude of at least each said pixel in said pixel group; and said evaluating means comprising computing apparatus coupled to receive the digital representations of at least said pixel group.

12. The laser-materials processing system of claim 8 wherein said materials processing laser generates said laser beam as a sequence of beam pulses; said representing means providing the intensity magnitudes of said pixel group corresponding to images of predetermined ones of said beam pulses; and said evaluating means single pixel averaging the pixel group intensity magnitudes corresponding to said predetermined beam pulses and determining said beam diameter from the last recited averaged pixel magnitudes.

13. A method for determining an incident diameter of a laser beam at a point of laser beam-material interaction on a workpiece in a laser-materials processing system, comprising the steps of:

providing an image of said laser beam-material interaction point;

representing said image as a plurality of pixels each having an intensity magnitude and a pixel address; and evaluating the magnitudes of a selected group of said pixels at corresponding selected pixel addresses along a predetermined beam image diameter line to determine said laser beam diameter therefrom.

14. The method of claim 13 wherein the pixel address of a beam center pixel is predetermined, said pixel group comprising at least one row of pixels along said beam diameter line, said evaluating step comprising the substeps of:

determining the pixel intensity magnitude of said beam center pixel;

computing a beam perimeter pixel intensity magnitude as a predetermined fraction of said beam center pixel magnitude; and determining the pixel addresses of a first and a second beam perimeter pixel located along the pixel row and respectively on opposite sides of said center pixel, such that the magnitude of each said first and second beam perimeter pixel is less than that of the pixels both along the row and successively closer to the center pixel and is equal to or less than said perimeter pixel magnitude, said laser beam diameter being proportional to the distance between said first and second beam perimeter pixels.

15. The method of claim 13 wherein said pixel group comprises at least one row of pixels along said beam diameter line, said evaluating step comprising the substeps of:

determining the pixel address of a beam center pixel having a maximum pixel intensity magnitude within said pixel group;

computing a beam perimeter pixel intensity magnitude as a predetermined fraction of said beam center pixel magnitude; and determining the pixel addresses of a first and a second beam perimeter pixel located along the pixel row and respectively on opposite sides of said center pixel, such that the magnitude of each said first and second beam perimeter pixel is less than that of the pixels both along the row and successively closer to the center pixel and is equal to or less than said perimeter pixel magnitude, said laser beam diameter being proportional to the distance between said first and second beam perimeter pixels.

* * * * *